United States Patent
Sloane et al.

(10) Patent No.: US 11,765,100 B1
(45) Date of Patent: Sep. 19, 2023

(54) SYSTEM FOR INTELLIGENT CAPACITY PLANNING FOR RESOURCES WITH HIGH LOAD VARIANCE

(71) Applicant: BANK OF AMERICA CORPORATION, Charlotte, NC (US)

(72) Inventors: Brandon Sloane, Indian Land, SC (US); James Thomas MacAulay, Erie, CO (US); Serge Alejandro Neri, Charlotte, NC (US); Lauren Jenae Alibey, Charlotte, NC (US); Sophie Morgan Danielpour, Durham, NC (US); Jinyoung Nathan Kim, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 5 days.

(21) Appl. No.: 17/723,786

(22) Filed: Apr. 19, 2022

(51) Int. Cl.
*H04L 47/70* (2022.01)
*G06N 20/00* (2019.01)

(52) U.S. Cl.
CPC ........... *H04L 47/823* (2013.01); *G06N 20/00* (2019.01)

(58) Field of Classification Search
CPC .............................. H04L 47/823; G06N 20/00
See application file for complete search history.

(56) References Cited

U.S. PATENT DOCUMENTS

| | | | |
|---|---|---|---|
| 5,526,353 | A | 6/1996 | Henley |
| 6,044,374 | A | 3/2000 | Nesamoney |
| 6,115,785 | A | 9/2000 | Estakhri |
| 6,347,301 | B1 | 2/2002 | Bearden, III |
| 6,704,815 | B1 | 3/2004 | Morikawa |
| 6,842,866 | B2 | 1/2005 | Song |
| 7,194,582 | B1 | 3/2007 | Diefendorff |
| 7,412,516 | B1 | 8/2008 | Brown |
| 7,487,444 | B2 | 2/2009 | Lira |
| 7,702,748 | B2 | 4/2010 | Ramey |
| 7,941,790 | B2 | 5/2011 | Cabillic |
| 8,060,662 | B2 | 11/2011 | Aihara |
| 8,229,873 | B1 | 7/2012 | Dolan |
| 8,484,253 | B2 | 7/2013 | Thiesson |
| 8,554,914 | B2 | 10/2013 | Warwick |
| 8,566,916 | B1 | 10/2013 | Vernon |
| 8,924,131 | B2 | 12/2014 | Kowalkowski |

(Continued)

*Primary Examiner* — Thomas J Dailey
(74) *Attorney, Agent, or Firm* — Moore & Van Allen PLLC; Anup Shrinivasan Iyer

(57) ABSTRACT

Systems, computer program products, and methods are described herein for intelligent capacity planning for resources with high load variance. The present invention is configured to receive, from a user input device, an input to process a request at a first time; determine network resources required to process the request; determine a current capacity of the network resources at the first time; retrieve, from an internal repository, a first predefined threshold associated with the network resources, wherein the first predefined threshold is associated with the current capacity; retrieve, from the request, a resource requirement associated with processing the request; determine that the resource requirement is greater than the first predefined threshold; and in response, generate a dashboard report, wherein the dashboard report indicates that the network resources are at a peak load capacity at the first time; and display the dashboard report to the user input device.

20 Claims, 5 Drawing Sheets

(56) References Cited

U.S. PATENT DOCUMENTS

| | | | |
|---|---|---|---|
| 9,170,905 B2 | 10/2015 | Astigarraga | |
| 9,477,762 B2 | 10/2016 | Coudron | |
| 10,286,139 B2 | 5/2019 | Criado | |
| 10,291,730 B1* | 5/2019 | Shavell | H04M 15/00 |
| 10,887,781 B2* | 1/2021 | Pandey | H04W 24/02 |
| 11,392,843 B2* | 7/2022 | Desai | G06Q 10/06315 |
| 2017/0061321 A1* | 3/2017 | Maiya Belur | G06Q 10/06315 |
| 2021/0136178 A1* | 5/2021 | Casey | H04L 67/146 |
| 2021/0271517 A1* | 9/2021 | Guim Bernat | G06F 9/505 |
| 2021/0344611 A1* | 11/2021 | Sakata | H04L 41/0895 |
| 2021/0397374 A1* | 12/2021 | Agarwal | G06F 9/542 |
| 2022/0253689 A1* | 8/2022 | Lange | G06N 3/08 |
| 2022/0318060 A1* | 10/2022 | Choochotkaew | G06F 9/5005 |

\* cited by examiner

SYSTEM FOR INTELLIGENT CAPACITY PLANNING FOR RESOURCES WITH HIGH LOAD VARIANCE

FIELD OF THE INVENTION

The present invention embraces a system for intelligent capacity planning for resources with high load variance.

BACKGROUND

Network capacity planning is an ongoing process that involves continually assessing network utilization, traffic volumes, and traffic type at various periods of operation to identify potential chokepoints that affect performance and user experience. Capacity planning involves considering a baseline bandwidth utilization of network resources when a request is received and determines whether the network resources have the capacity to handle the request efficiently and effectively without causing a chokepoint. With network resources at a premium, and some resources having extremely high load variance, it is often very difficult to plan for appropriate capacity. There is a need for a non-intrusive mechanism capable of throttling usage requirements during high load times and maybe shift those requests to lower load times.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, system for intelligent capacity planning for resources with high load variance is presented. The system comprising: at least one non-transitory storage device; and at least one processor coupled to the at least one non-transitory storage device, wherein the at least one processor is configured to: receive, from a user input device, an input to process a request within a distributed computing environment at a first time; retrieve, from the request, a resource requirement associated with processing the request; determine, using a resource interception subsystem, network resources required to process the request based on at least the resource requirements; determine, using an ML subsystem, a current capacity of the network resources at the first time; retrieve, from an internal repository, a first predefined threshold associated with the network resources, wherein the first predefined threshold is associated with the current capacity; determine that the resource requirement is greater than the first predefined threshold; in response, generate, using a reporting subsystem, a dashboard report, wherein the dashboard report indicates that the network resources are at a peak load capacity at the first time; and transmit control signals configured to cause the user input device to display the dashboard report.

In some embodiments, the at least one processor is further configured to: receive, from a network administrator device, a registration request for the network resources; retrieve resource attributes associated with the network resources; and register the network resources and the resource attributes associated with the network resources.

In some embodiments, the resource attributes comprise at least component configurations of the network resources, processing times associated with processing past requests, dependencies associated with the network resources, type of requests previously processed, tolerance of the network resources, and/or average number of requests processed at any particular time instant.

In some embodiments, the at least one processor is further configured to: determine the current capacity of the network resources based on at least the resource attributes.

In some embodiments, the at least one processor is further configured to: predict, using the ML subsystem, a future capacity of the network resources at a second time; determine a second predefined threshold associated with the network resources, wherein the second predefined threshold is associated with the future capacity; determine that the resource requirement is likely to be lesser than the second predefined threshold at the second time; and in response, generate, using the reporting subsystem, the dashboard report, wherein the dashboard report indicates that the network resources are available to process the request at the second time.

In some embodiments, predicting the future capacity further comprises: training, using the ML subsystem, a machine learning (ML) model using the resource attributes associated with the network resources, one or more time periods of operation, and past load capacities of the network resources at the one or more time periods of operation; and generate the trained ML model based on at least the training.

In some embodiments, the at least one processor is further configured to: predict, using the trained ML model, the future capacity of the network resources.

In some embodiments, the at least one processor is further configured to: capture information associated with the request at the first time; and store, in a request repository, the information associated with the request.

In some embodiments, the at least one processor is further configured to: at the second time, retrieve, from the request repository, the information associated with the request; in response, transmit control signals configured to cause the user input device to display a prompt indicating that the network resources are available to process the request; receive, from the user input device, a user acknowledgement to process the request at the second time; retrieve, from the request repository, the information associated with the request; and process the request at the second time based on at least the user acknowledgement.

In some embodiments, the at least one processor is further configured to: determine a processing time associated with processing the request during peak load capacity; and generate, using the reporting subsystem, the dashboard report, wherein the dashboard report indicates the processing time.

In another aspect, a computer program product for intelligent capacity planning for resources with high load variance is presented. The computer program product comprising a non-transitory computer-readable medium comprising code causing a first apparatus to: receive, from a user input device, an input to process a request within a distributed computing environment at a first time; retrieve, from the request, a resource requirement associated with processing the request; determine, using a resource interception subsystem, network resources required to process the request based on at least the resource requirements; determine, using an ML subsystem, a current capacity of the network resources at the first time; retrieve, from an internal repository, a first predefined threshold associated with the network resources, wherein the first predefined threshold is associated with the current capacity; determine that the resource requirement is greater than the first predefined threshold; in response, generate, using a reporting subsystem, a dashboard report, wherein the dashboard report indicates that the network resources are at a peak load capacity at the first time; and transmit control signals configured to cause the user input device to display the dashboard report.

In yet another aspect, a method for intelligent capacity planning for resources with high load variance is presented. The method comprising: receiving, from a user input device, an input to process a request within a distributed computing environment at a first time; retrieving, from the request, a resource requirement associated with processing the request; determining, using a resource interception subsystem, network resources required to process the request based on at least the resource requirements; determining, using an ML subsystem, a current capacity of the network resources at the first time; retrieving, from an internal repository, a first predefined threshold associated with the network resources, wherein the first predefined threshold is associated with the current capacity; determining that the resource requirement is greater than the first predefined threshold; in response, generating, using a reporting subsystem, a dashboard report, wherein the dashboard report indicates that the network resources are at a peak load capacity at the first time; and transmitting control signals configured to cause the user input device to display the dashboard report.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
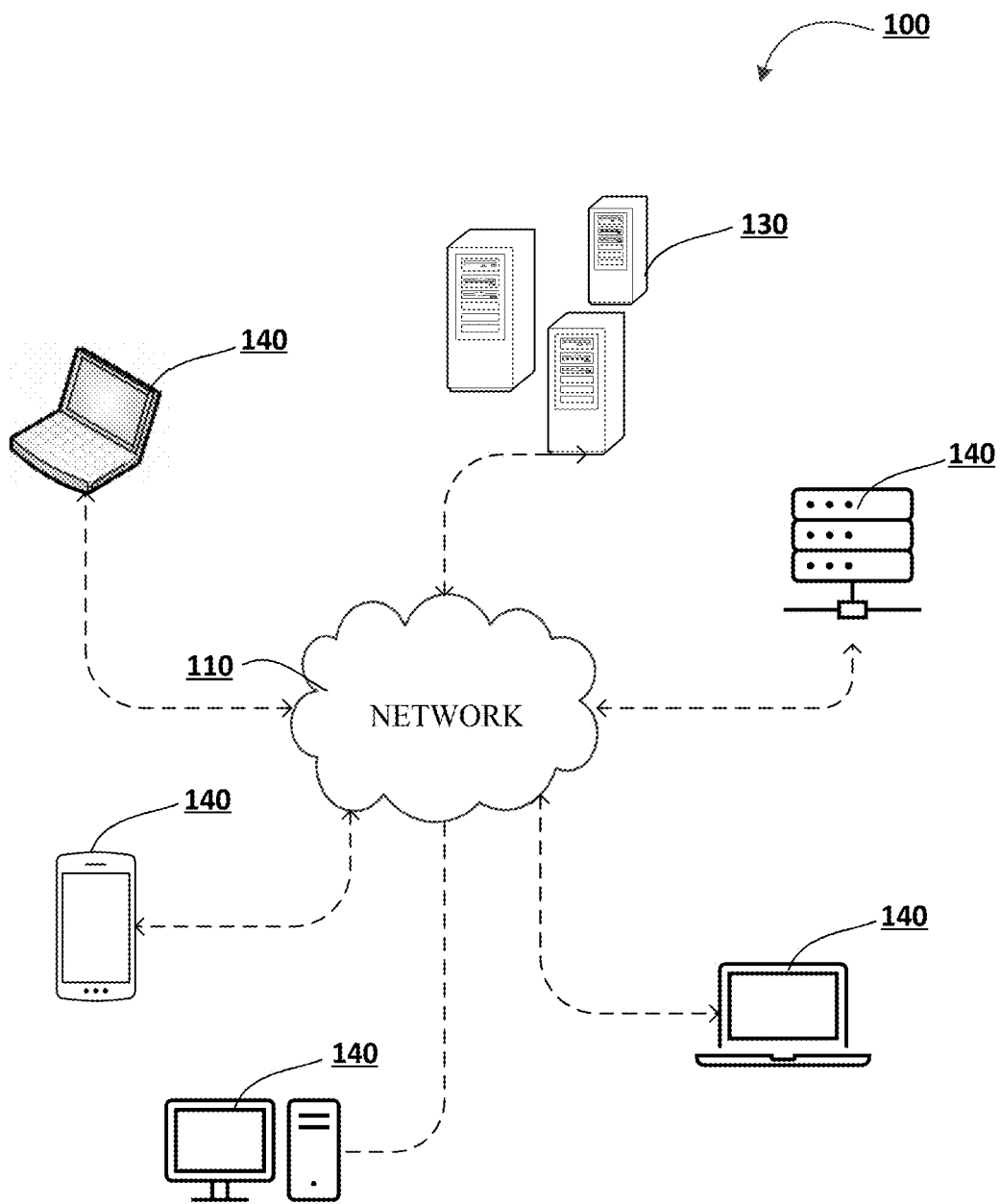
Figure 1B:
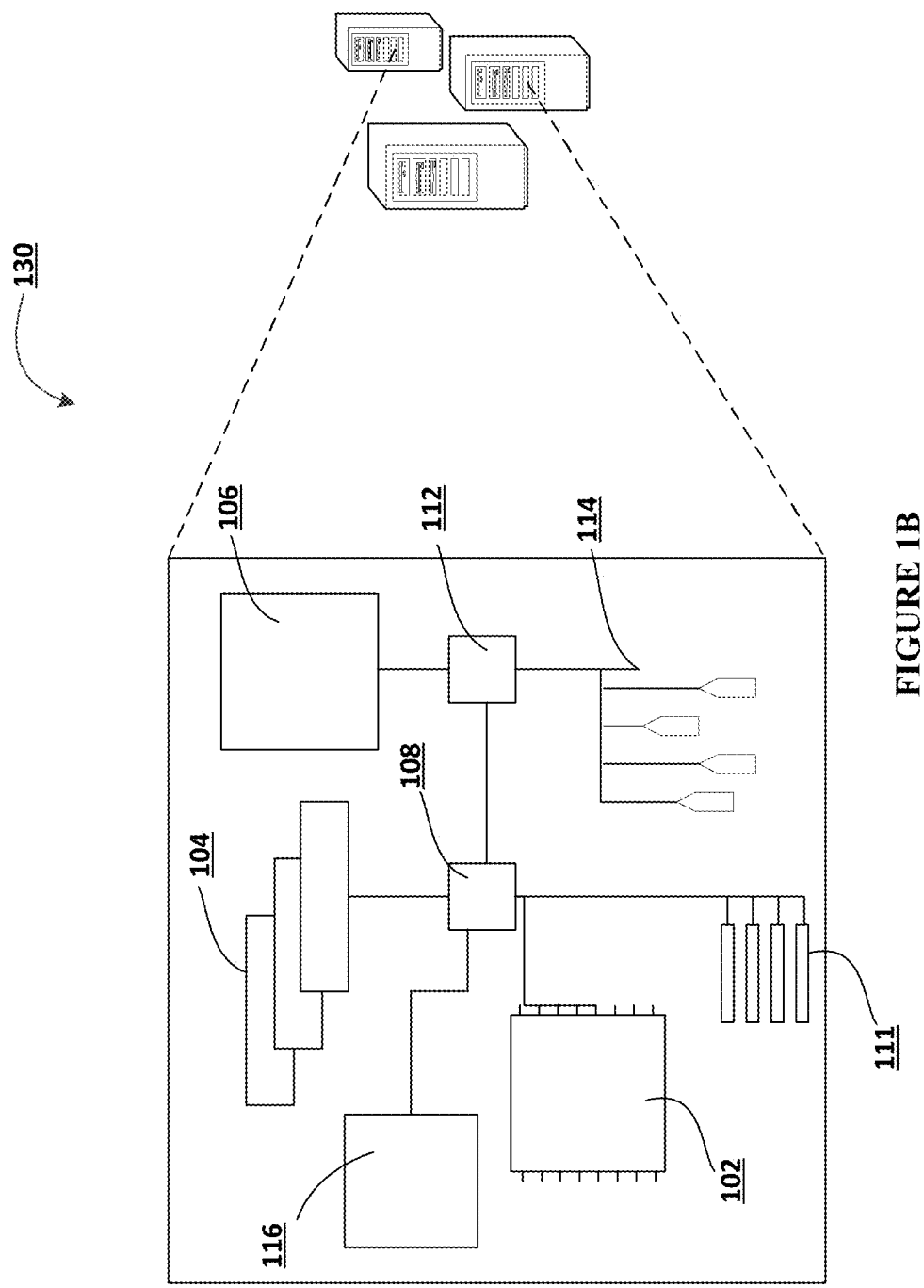
Figure 1C:
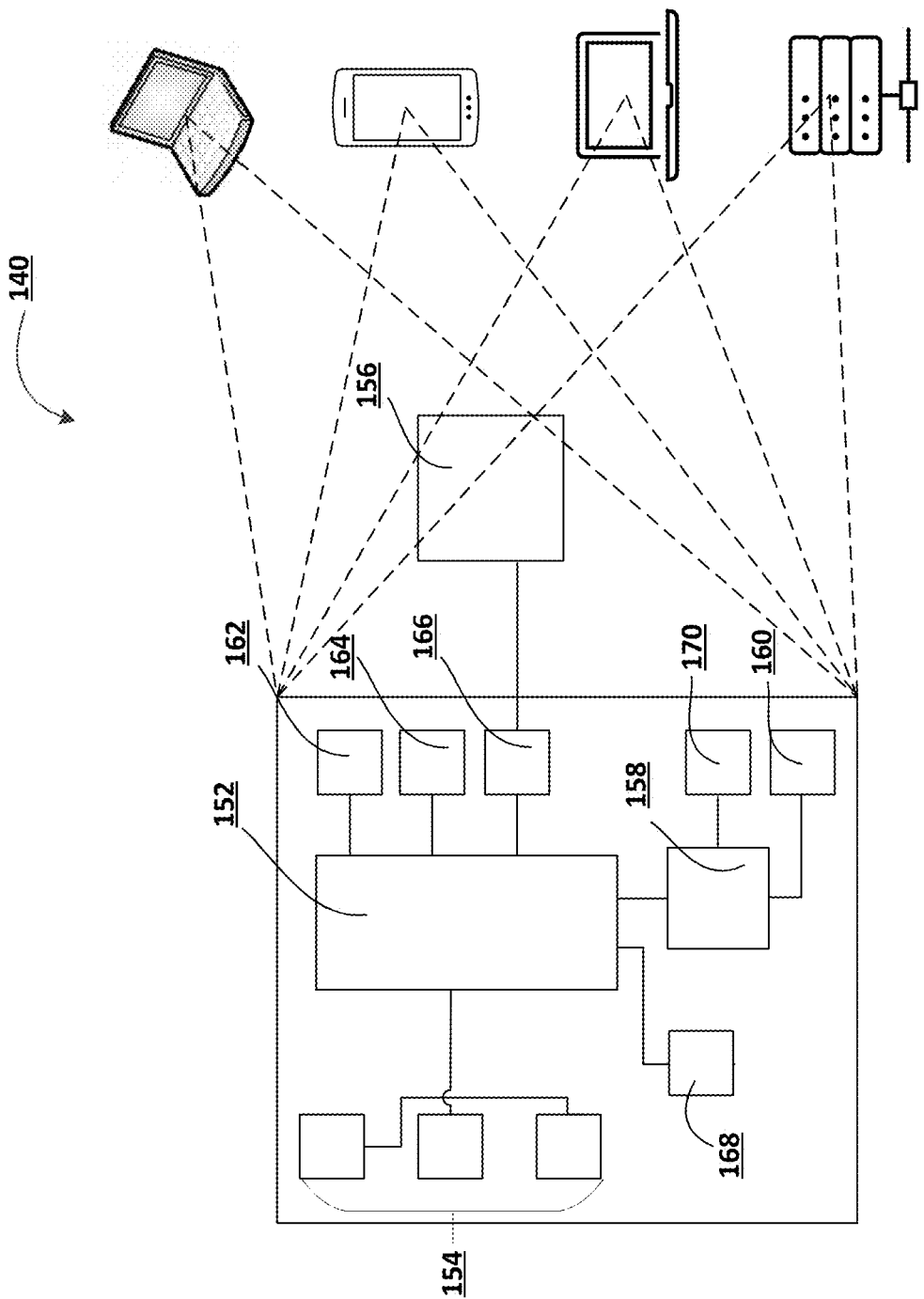
Figure 2:
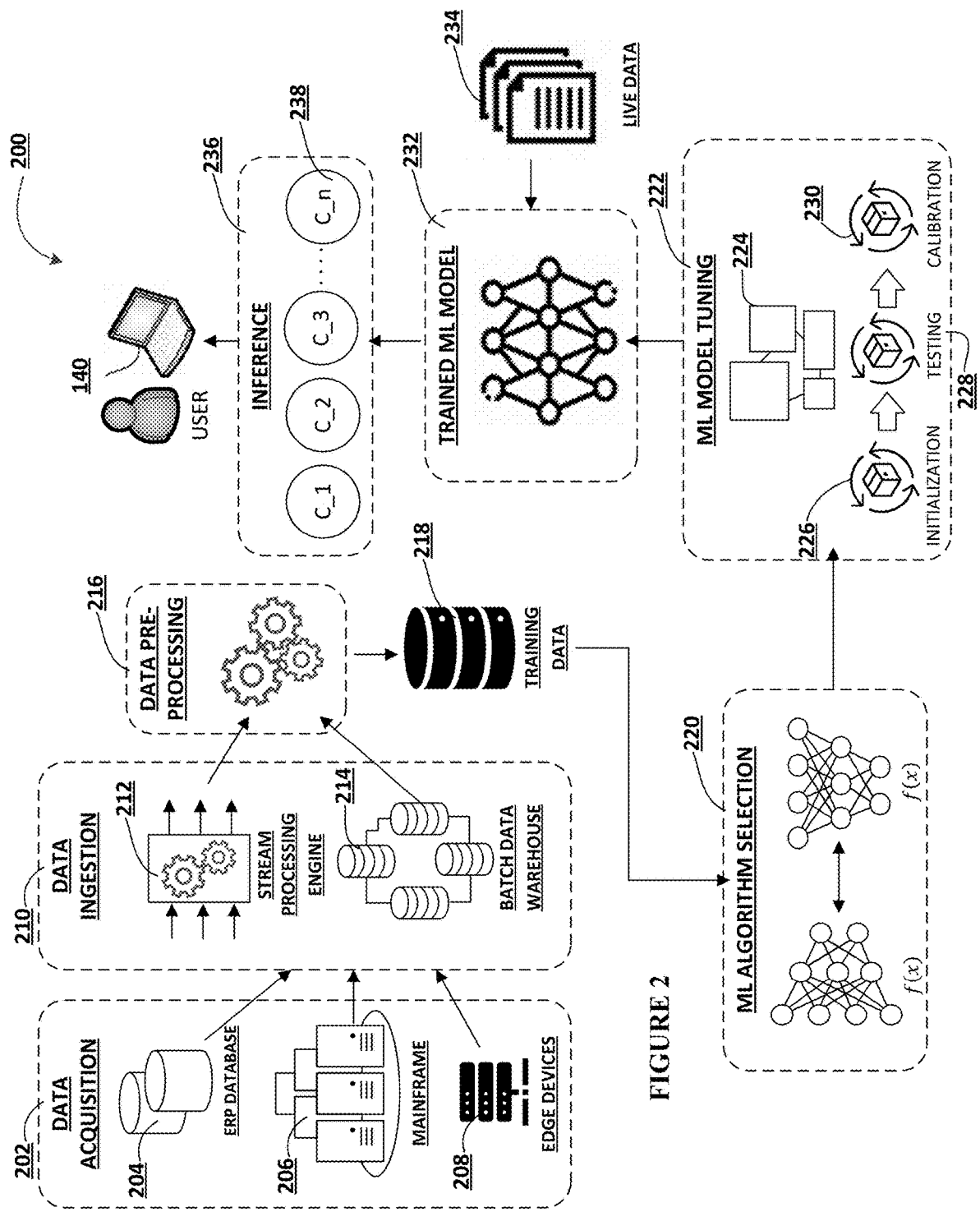
Figure 3:
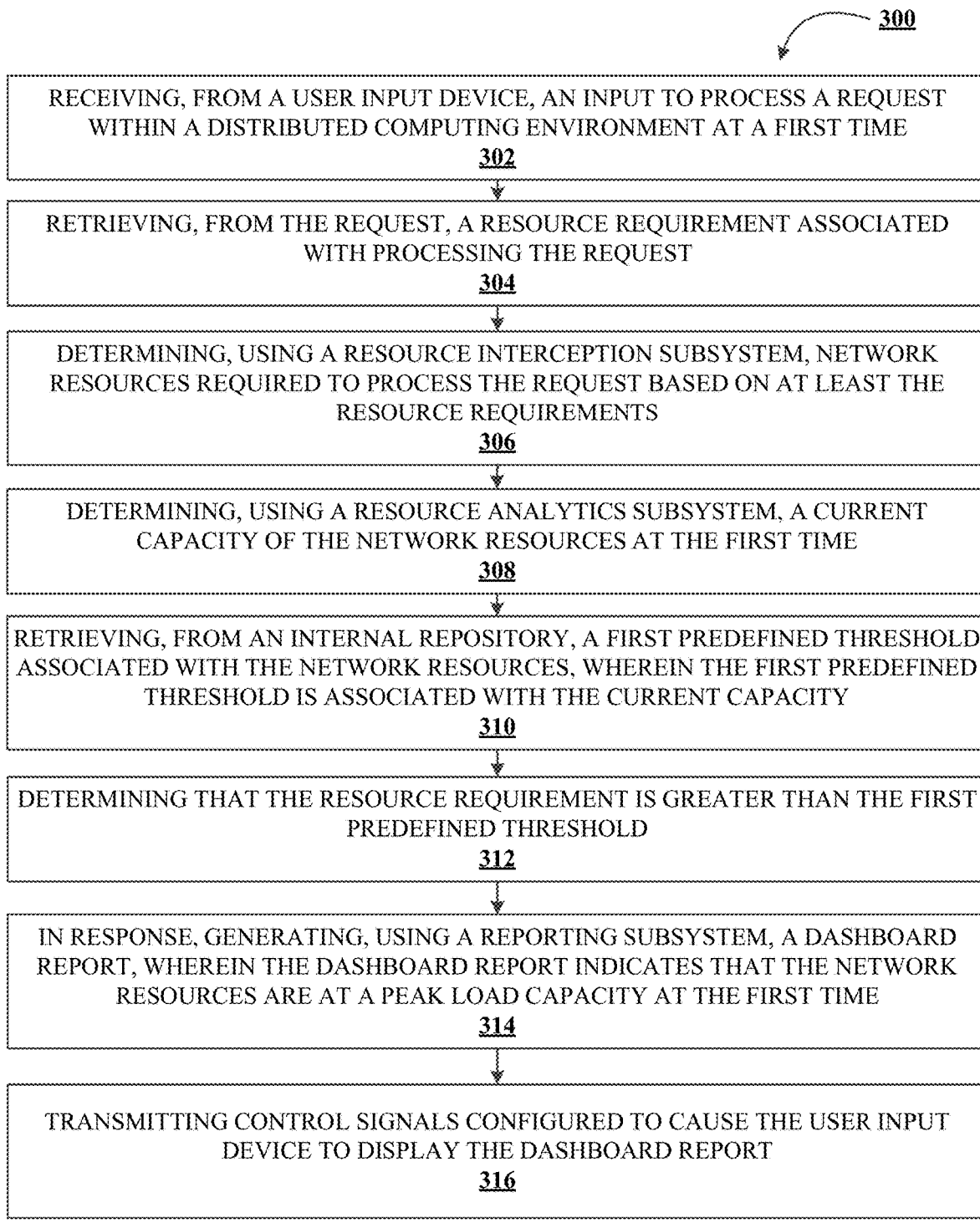

Having thus described embodiments of the invention in general terms, reference will now be made the accompanying drawings, wherein:

FIGS. 1A-1C illustrates technical components of an exemplary distributed computing environment for intelligent capacity planning for resources with high load variance, in accordance with an embodiment of the invention;

FIG. 2 illustrates an exemplary ML subsystem architecture, in accordance with an embodiment of the invention; and FIG. 3 illustrates a process flow for intelligent capacity planning for resources with high load variance, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" or "network resource" may generally refer to software and/or hardware components in a computing environment that are accessible via a shared connection. In some embodiments, a resource may refer to forms of data and information that can be accessed by a group of computers through a network. Accordingly, a resource may be any kind of device, information, or service available across a network. Such a resource could be a set of files, an application or service of some kind, a network accessible peripheral device, and/or the like.

Network capacity planning is an ongoing process that involves continually assessing network utilization, traffic volumes, and traffic type at various periods of operation to identify potential chokepoints that affect performance and user experience. Capacity planning involves considering a baseline bandwidth utilization of network resources when a request is received and determines whether the network resources have the capacity to handle the request efficiently and effectively without causing a chokepoint. With network resources at a premium, and some resources having extremely high load variance, it is often very difficult to plan for appropriate capacity. There is a need for a non-intrusive mechanism capable of throttling usage requirements during high load times and maybe shift those requests to lower load times.

Accordingly, the present invention provides a technical solution to a technical problem of dynamically controlling network resource usage to reduce the number of chokepoints during hours of peak load capacity and shift requests that are received during such hours to lower load times. The technical solution presented herein includes, (i) an inventory management component which allows network (or resource) administrators to register their resources (e.g., network resources). This registration process includes the collection of resource attributes component configurations of the network resources, processing times associated with processing past requests, dependencies associated with the network resources, type of requests previously processed, tolerance of the network resources, average number of requests processed at any particular time instant, and/or the like, (ii) a resource interception subsystem which intercepts any request received, and determines whether the current capacity and load of the network resources meet the resource requirements for processing the request. This calculation can include things such as the type of request that is received, and other anticipated requests at this time or day or geographic location. Once a calculation has been performed, the resource interception subsystem communicates with the machine learning (ML) subsystem to make a determination on whether or not the network resources are currently available for the processing the user's request, (iii) an ML subsystem that determines all of the predefined thresholds for the network resources which may be set by the network administrator (or resource owner) when the network resources where first registered. The ML subsystem also performs resource analytics operations using AI/ML techniques by utilizing historical data and any additional capacity/load data or other data types to determine whether the network resources are available for processing the user's request instantly. If the network resources are not available for immediate processing, or if the processing times may potentially cause a chokepoint, the ML subsystem may also determine a future time when the capacity of the network resources are likely to be adequately low to process the request then. Once a future time is determined, the ML subsystem may make the determination to "nudge" the user to process the request at the future time instead. Such nudges may either be a simple prompt indicating that the network resources are at peak load capacity and the user should consider coming back later, or a more visual indicator which displays a full graphic of network resources and anticipated wait times over a period of time. In some implementations, nudges could also convert to full blown access control mechanisms, and (iv) a reporting subsystem that generates a dashboard report for the user to communicate information regarding load capacity of the network resources. In some implementations, the reporting subsystem allows network administrators to track requests, traffic patterns, and feed downstream systems which would analyze and inspect this information for subsequent behavioral analysis.

FIGS. 1A-1C illustrate technical components of an exemplary distributed computing environment for intelligent capacity planning for resources with high load variance 100, in accordance with an embodiment of the invention. As shown in FIG. 1A, the distributed computing environment 100 contemplated herein may include a system 130, a client device(s) 140, and a network 110 over which the system 130 and client device(s) 140 communicate there between. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the client device(s) 140 may have a client-server relationship in which the client device(s) 140 are remote devices that request and receive service from a centralized server, i.e., the system 130. In some other embodiments, the system 130 and the client device(s) 140 may have a peer-to-peer relationship in which the system 140 and the client device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The client device(s) 140 may represent various forms of electronic devices, including user input devices such as personal digital assistants, cellular telephones, smartphones, laptops, desktops, and other similar computing devices.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the client device(s) 140, in accordance with an embodiment of the invention. As shown in FIG. 1C, the client device(s) 140 includes a processor 152, memory 154, an input/output device such as a display 156, a communication interface 158, and a transceiver 160, among other components. The client device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the client device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the client device(s) 140, such as control of user interfaces, applications run by client device(s) 140, and wireless communication by client device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of client device(s) 140 with other devices. External interface 168 may provide, for example, for wired communication in some implementations, or for wireless communication in other implementations, and multiple interfaces may also be used.

The memory 154 stores information within the client device(s) 140. The memory 154 can be implemented as one or more of a computer-readable medium or media, a volatile memory unit or units, or a non-volatile memory unit or units. Expansion memory may also be provided and connected to client device(s) 140 through an expansion interface (not shown), which may include, for example, a SIMM (Single In Line Memory Module) card interface. Such expansion memory may provide extra storage space for client device(s) 140 or may also store applications or other information therein. In some embodiments, expansion memory may include instructions to carry out or supplement the processes described above and may include secure information also. For example, expansion memory may be provided as a security module for client device(s) 140 and may be programmed with instructions that permit secure use of client device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer-or machine-readable medium, such as the memory 154, expansion memory, memory on processor 152, or a propagated signal that may be received, for example, over transceiver 160 or external interface 168.

In some embodiments, the user may use the client device(s) 140 to transmit and/or receive information or commands to and from the system 130 via the network 110. Any communication between the system 130 and the client device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the client device(s) 140 may provide the system 130 (or other client devices) permissioned access to the protected resources of the client device(s) 140, which may include a GPS device, an image capturing component (e.g., camera), a microphone, and/or a speaker.

The client device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to client device(s) 140, which may be used as appropriate by applications running thereon, and in some embodiments, one or more applications operating on the system 130.

The client device(s) 140 may also communicate audibly using audio codec 162, which may receive spoken information from a user and convert it to usable digital information. Audio codec 162 may likewise generate audible sound for a user, such as through a speaker, e.g., in a handset of client device(s) 140. Such sound may include sound from voice telephone calls, may include recorded sound (e.g., voice messages, music files, etc.) and may also include sound generated by one or more applications operating on the client device(s) 140, and in some embodiments, one or more applications operating on the system 130.

Various implementations of the distributed computing environment 100, including the system 130 and client device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the invention. The ML subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the ML subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., C_1, C_2 . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C_1, C_2 . . . C_n 238) live data 234 based on how similar they are to one another to solve exploratory challenges where little is known about the data, provide a description or label (e.g., C_1, C_2 . . . C_n 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the ML subsystem 200 illustrated in FIG. 2 is exemplary and that other embodiments may vary. As another example, in some embodiments, the ML subsystem 200 may include more, fewer, or different components.

FIG. 3 illustrates a process flow for intelligent capacity planning for resources with high load variance 300, in accordance with an embodiment of the invention. As shown in block 302, the process flow includes receiving, from a user input device, an input to process a request within a distributed computing environment at a first time. In some embodiments, the system may be configured to capture the information associated with the request and store the information in a request repository.

Next, as shown in block 304, the process flow includes retrieving, from the request, a resource requirement associated with processing the request. In some embodiments, the resource requirement may include specific capabilities or attributes needed to process the request. These requirements may either be defined by the user or may be dynamically extracted from the request. In one aspect, the resource requirements may include a list of specific network resources required to process the request. Each network resource listed in the requirements may include a predetermined amount associated with them. In other words, the resources requirement may not only list which network resources are required to process the request, but also how much of those resources are required for processing.

Next, as shown in block 306, the process flow includes determining, using a resource interception subsystem, network resources required to process the request based on at least the resource requirements. Network resources may have to be registered prior to being available to the user to process any requests. Accordingly, in some embodiments, the system may be configured to receive, from a network administrator device, a registration request for the network resources. Then, the system may be configured to retrieve resource attributes associated with the network resources. In some embodiments, the resource attributes may include component configurations of the network resources, processing times associated with processing past requests, dependencies associated with the network resources, type of requests previously processed, tolerance of the network resources, average number of requests processed at any particular time instant, a memory size and usage, response time, average latency, error rate, requests per second, throughput, and/or the like. In response, the system may be configured to register the network resources and the resource attributes associated with the network resources. Once registered, these network resources may become available to the user to process any requests.

Next, as shown in block 308, the process flow includes determining, using an ML subsystem, a current capacity of the network resources at the first time. Leveraging artificial intelligence (AI) to analyze data from multiple sources offers much greater accuracy than the traditional network monitoring tools. AI also enables modeling of different performance scenarios and ties network performance to request processing performance to determine how processing such requests are impacted in different performance scenarios. Accordingly, AI and ML methods can be effectively applied to traffic prediction/forecasting, traffic pattern detection, online learning and automated decision making. In some embodiments, the current capacity of the network resources may be determined based on at least the resource attributes of the network resources. In this regard, the ML subsystem may be configured to continuously monitor the network resources in real-time to determine the current capacity in terms of traffic data volume, duration (i.e., time) and/or events.

Next, as shown in block 310, the process flow includes retrieving, from an internal repository, a first predefined threshold associated with the network resources, wherein the first predefined threshold is associated with the current capacity. Considering the current capacity of the network resources at the first time, i.e., the time when the request is received, the system may be configured to determine the first predefined threshold based on the current capacity of the network resources. The first predefined threshold may be used to determine whether the network resources have adequate capacity to process the request received from the user at the first time. In some embodiments, the predefined threshold may be a percentage of the current capacity. In some cases, the current capacity of the network resources may be less than the resource requirements associated with processing the request. In some other cases, the current capacity of the network resources may be more than the resource requirements associated with processing the request. However, in some of these cases, even though the current capacity is greater than the resource requirements, processing the request may cause a potential chokepoint that may delay operations. By establishing the predefined threshold as part of the current capacity, the system may be configured to determine whether the network resources have adequate capacity to not only process the request, but do so without causing downstream issues, thus improving overall performance. In some other embodiments, the predefined threshold may not be based on the current capacity, but rather be defined by network administrators arbitrarily for each network resource when registering them.

Next, as shown in block 312, the process flow includes determining that the resource requirement is greater than the first predefined threshold. In some embodiments, if the resource requirement is greater than the first predefined threshold, it is an indication that the network resources are unable to process the request at the first time. In some other embodiments, if the resource requirement is greater than the predefined threshold, it is an indication that the network resources are available for processing the request at the first time, however, processing the request will likely cause an operational chokepoint in the network resource that may have detrimental effects. On the other hand, if the resource requirement is lesser than the first predefined threshold, it is an indication that the network resources are able to process the request, and the request is subsequently processed.

Next, as shown in block 314, the process flow includes in response, generating, using a reporting subsystem, a dashboard report, wherein the dashboard report indicates that the network resources are at a peak load capacity at the first time. In some embodiments, the dashboard report may either be a simple prompt indicating that the network resources are at peak load capacity and the user should consider coming back later, or a more visual indicator which displays a full graphic illustrating current load capacity of each network resource. In addition, the dashboard report may include a wait time for the user before the request can be processed during peak load capacity, a processing time, i.e., an amount of time it takes to process the request once the processing has begun during peak load capacity, potential dependency effects of processing the request at the first time, and/or the like.

In some embodiments, in cases where the resource requirements are greater than the first predefined threshold, the system may be configured to determine a future time where the network resources are available to process the request for the user. This is achieved by predicting a future capacity of the network resources. Based on the future capacity of the network resources, the system may be configured to define a second predefined threshold and compare the resource requirements to the second predefined threshold. If the resource requirements are less than the second predefined threshold, it is an indication that the network resources are available for processing the request at the future time, i.e., second time.

To predict the future capacity of the network resources, the system may be configured to implement machine learning techniques. Accordingly, the system may be configured to deploy a trained ML model on the network resources, the current capacity at the first time, a time period associated with the first time, and resource attributes of the network resources. As described herein, the machine learning model may refer to a mathematical model generated by machine learning algorithms based on training data, to make predictions or decisions without being explicitly programmed to do so. To this end, the ML subsystem may be configured to ingest the resource attributes associated with the network resources, one or more time periods of operation, and past load capacities of the network resources at the one or more time periods of operation. In response, the ML subsystem may be configured to generate a training dataset using the resource attributes associated with the network resources, one or more time periods of operation, and past load capacities of the network resources at the one or more time periods of operation as features. By training the ML model with these features, the ML subsystem may be configured to build a trained ML model that is capable of predicting the future capacity of the network resources and the second time when the network resources are available to process the request. In response, the system may be configured to include the future capacity and the second time in the dashboard report for the user.

Next, as shown in block 316, the process flow includes transmitting control signals configured to cause the user input device to display the dashboard report.

At the second time, the system may be configured to retrieve, from the request repository, the information associated with the request. Once retrieved, the system may be configured to transmit control signals configured to cause the user input device to display a prompt indicating that the network resources are available to process the request. In response, the system may be configured to receive, from the user input device, a user acknowledgement to process the request at the second time. Once the user acknowledgement is received the system may be configured to process the request at the second time.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for intelligent capacity planning for resources with high load variance, the system comprising:
   at least one non-transitory storage device; and
   at least one processor coupled to the at least one non-transitory storage device, wherein the at least one processor is configured to:
   receive, from a user input device, an input to process a request within a distributed computing environment at a first time;

retrieve, from the request, a resource requirement associated with processing the request;

determine, using a resource interception subsystem, network resources required to process the request based on at least the resource requirements;

determine, using a machine learning (ML) subsystem, a current capacity of the network resources at the first time;

retrieve, from an internal repository, a first predefined threshold associated with the network resources, wherein the first predefined threshold is associated with the current capacity;

determine that the resource requirement is greater than the first predefined threshold;

predict, using the ML subsystem, a future capacity of the network resources at a second time;

determine a second predefined threshold associated with the network resources, wherein the second predefined threshold is associated with the future capacity;

determine that the resource requirement is lesser than the second predefined threshold at the second time; and in response, generate, using a reporting subsystem, a dashboard report, wherein the dashboard report indicates that the network resources are at a peak load capacity at the first time and that the network resources are available to process the request at the second time; and transmit control signals configured to cause the user input device to display the dashboard report.

2. The system of claim 1, wherein the at least one processor is further configured to:
receive, from a network administrator device, a registration request for the network resources;
retrieve resource attributes associated with the network resources; and
register the network resources and the resource attributes associated with the network resources.

3. The system of claim 2, wherein the resource attributes comprise at least component configurations of the network resources, processing times associated with processing past requests, dependencies associated with the network resources, type of requests previously processed, tolerance of the network resources, and/or average number of requests processed at any particular time instant.

4. The system of claim 3, wherein the at least one processor is further configured to:
determine the current capacity of the network resources based on at least the resource attributes.

5. The system of claim 1, wherein predicting the future capacity further comprises:
training, using the ML subsystem, a machine learning (ML) model using the resource attributes associated with the network resources, one or more time periods of operation, and past load capacities of the network resources at the one or more time periods of operation; and
generate the trained ML model based on at least the training.

6. The system of claim 5, wherein the at least one processor is further configured to:
predict, using the trained ML model, the future capacity of the network resources.

7. The system of claim 1, wherein the at least one processor is further configured to:
capture information associated with the request at the first time; and
store, in a request repository, the information associated with the request.

8. The system of claim 7, wherein the at least one processor is further configured to:
at the second time, retrieve, from the request repository, the information associated with the request;
in response, transmit control signals configured to cause the user input device to display a prompt indicating that the network resources are available to process the request;
receive, from the user input device, a user acknowledgement to process the request at the second time; and
process the request at the second time based on at least the user acknowledgement.

9. The system of claim 1, wherein the at least one processor is further configured to:
determine a processing time associated with processing the request during peak load capacity; and
generate, using the reporting subsystem, the dashboard report, wherein the dashboard report indicates the processing time.

10. A computer program product for intelligent capacity planning for resources with high load variance, the computer program product comprising a non-transitory computer-readable medium comprising code causing a first apparatus to:
receive, from a user input device, an input to process a request within a distributed computing environment at a first time;
retrieve, from the request, a resource requirement associated with processing the request;
determine, using a resource interception subsystem, network resources required to process the request based on at least the resource requirements;
determine, using a machine learning (ML) subsystem, a current capacity of the network resources at the first time;
retrieve, from an internal repository, a first predefined threshold associated with the network resources, wherein the first predefined threshold is associated with the current capacity;
determine that the resource requirement is greater than the first predefined threshold;
predict, using the ML subsystem, a future capacity of the network resources at a second time;
determine a second predefined threshold associated with the network resources, wherein the second predefined threshold is associated with the future capacity;
determine that the resource requirement is lesser than the second predefined threshold at the second time; and
in response, generate, using a reporting subsystem, a dashboard report, wherein the dashboard report indicates that the network resources are at a peak load capacity at the first time and that the network resources are available to process the request at the second time; and
transmit control signals configured to cause the user input device to display the dashboard report.

11. The computer program product of claim 10, wherein the code causes the first apparatus to:
receive, from a network administrator device, a registration request for the network resources;
retrieve resource attributes associated with the network resources; and
register the network resources and the resource attributes associated with the network resources.

12. The computer program product of claim 11, wherein the resource attributes comprise at least component configurations of the network resources, processing times associated with processing past requests, dependencies associated with the network resources, type of requests previously processed, tolerance of the network resources, and/or average number of requests processed at any particular time instant.

13. The computer program product of claim 12, wherein the code causes the first apparatus to:
determine the current capacity of the network resources based on at least the resource attributes.

14. The computer program product of claim 10, wherein the code causes the first apparatus to:
training, using the ML subsystem, a machine learning (ML) model using the resource attributes associated with the network resources, one or more time periods of operation, and past load capacities of the network resources at the one or more time periods of operation; and
generate the trained ML model based on at least the training.

15. The computer program product of claim 14, wherein the code causes the first apparatus to:
predict, using the trained ML model, the future capacity of the network resources.

16. The computer program product of claim 10, wherein the code causes the first apparatus to:
capture information associated with the request at the first time; and
store, in a request repository, the information associated with the request.

17. The computer program product of claim 16, wherein the code causes the first apparatus to:
at the second time, retrieve, from the request repository, the information associated with the request;
in response, transmit control signals configured to cause the user input device to display a prompt indicating that the network resources are available to process the request;
receive, from the user input device, a user acknowledgement to process the request at the second time;
process the request at the second time based on at least the user acknowledgement.

18. A method for intelligent capacity planning for resources with high load variance, the method comprising:
receiving, from a user input device, an input to process a request within a distributed computing environment at a first time;
retrieving, from the request, a resource requirement associated with processing the request;
determining, using a resource interception subsystem, network resources required to process the request based on at least the resource requirements;
determining, using a machine learning (ML) subsystem, a current capacity of the network resources at the first time;
retrieving, from an internal repository, a first predefined threshold associated with the network resources, wherein the first predefined threshold is associated with the current capacity;
determining that the resource requirement is greater than the first predefined thresholds;
predicting, using the ML subsystem, a future capacity of the network resources at a second time;
determining a second predefined threshold associated with the network resources, wherein the second predefined threshold is associated with the future capacity;
determining that the resource requirement is lesser than the second predefined threshold at the second time;
in response, generating, using a reporting subsystem, a dashboard report, wherein the dashboard report indicates that the network resources are at a peak load capacity at the first time and that the network resources are available to process the request at the second time; and
transmitting control signals configured to cause the user input device to display the dashboard report.

19. The method of claim 18, wherein the method further comprises:
receiving, from a network administrator device, a registration request for the network resources;
retrieving resource attributes associated with the network resources; and
registering the network resources and the resource attributes associated with the network resources.

20. The method of claim 19, wherein the resource attributes comprise at least component configurations of the network resources, processing times associated with processing past requests, dependencies associated with the network resources, type of requests previously processed, tolerance of the network resources, and/or average number of requests processed at any particular time instant.

* * * * *